(No Model.)
F. B. HARVEY.
NUT LOCK.
No. 445,469. Patented Jan. 27, 1891.
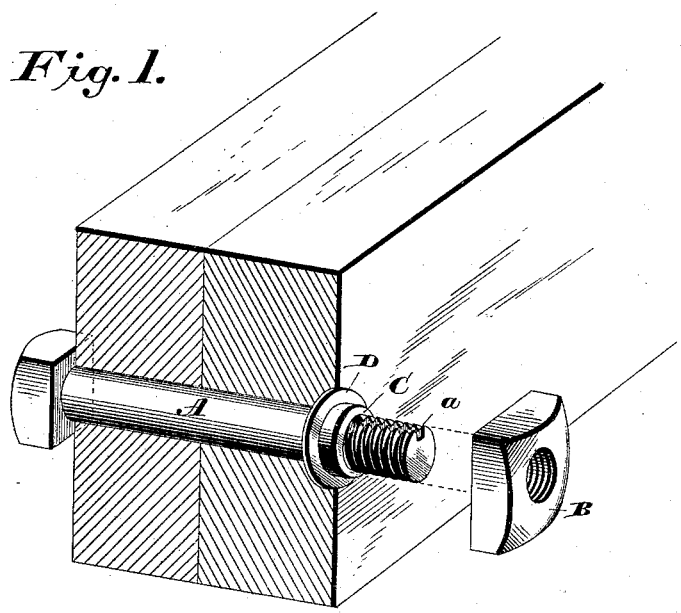
Fig. 1.
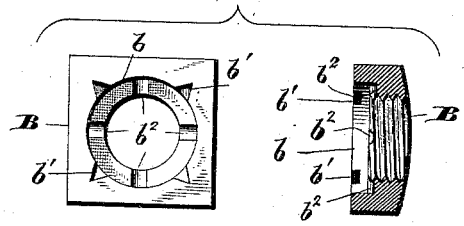
Fig. 2.
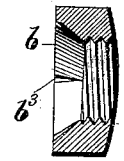
Fig. 4.
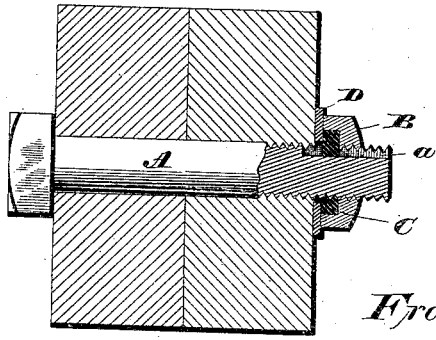
Fig. 3.
Francis B. Harvey.
Inventor
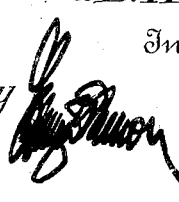
Witnesses

UNITED STATES PATENT OFFICE.

FRANCIS B. HARVEY, OF PICKERING, PENNSYLVANIA.

NUT-LOCK.

SPECIFICATION forming part of Letters Patent No. 445,469, dated January 27, 1891.

Application filed October 16, 1890. Serial No. 368,292. (No model.)

*To all whom it may concern:*

Be it known that I, FRANCIS B. HARVEY, a citizen of the United States of America, residing at Pickering, in the county of Chester and State of Pennsylvania, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in nut-locks.

The object of the invention is to provide a simple, cheap, and effective device by means of which a peculiarly-formed nut can be secured upon a bolt having a longitudinal recess, a soft-metal washer being employed in connection with said bolt and nut, which is adapted to be pressed when the nut is screwed home into the cavity of the nut, and slot in the bolt, so as to interlock the parts immovably one upon the other against all ordinary strain and jars which are liable to come upon them.

In the accompanying drawings, forming part of this specification, Figure 1 is a perspective view of a nut-lock, showing the nut off the bolt, the soft-metal ring being placed upon the bolt adjacent to the washer. Fig. 2 illustrates the construction of the nut. Fig. 3 is a sectional view, and Fig. 4 a sectional view of a modification.

A refers to the bolt, which is of ordinary construction, and is provided with a longitudinal slot $a$, which extends throughout the major portion of the threads cut in the bolt. The nut B is provided on its under side with a recess $b$, which extends around the threaded aperture in the nut, and this recess is preferably provided with a series of depressions $b^2$, which gives an irregular surface to the ring-receiving cavity. As the cavity occupies a portion of the nut which is usually threaded in practice, the nuts will be manufactured thicker than the usual ones.

In Fig. 2 of the drawings the recess in the nut is shown having straight edges, the base of said recess having depressed portions $b^2$, while in the base of the nut from the vertical edges of the recess adjacent to the corners of the nut are notches $b'$. In Fig. 4, which serves the same end as the device illustrated in Fig. 2, the recess is conical and provided with a suitable number of V-shaped depressions $b^3$.

C refers to a soft-metal washer, such as lead or composition having a lead base, the internal diameter thereof being such that it will slip easily over the threaded portion of the nut, and the transverse diameter of the same being such that it will more than fill the recess in the nut. This soft-metal ring is adapted to lie against a metal backing, as a fish-plate or rail, and when the parts connected by the bolt are not metal a washer D is used.

When the parts of my improved nut-lock are assembled, the soft-metal ring being placed in position, the nut B is screwed down, so as to press and upset the soft-metal ring, so that a portion thereof will be forced into the slot $a$ of the bolt as well as the threads of the same. The indentations become filled with the soft metal and hold the nut secure when it has been screwed down to its full extent.

In practice it has been found that this lock is effective, and the metal being softer than the bolt does not destroy the threads thereof, nor do the notches, as $b'$ $b^2$ $b^3$, in the nut cut away the metal as the nut is being screwed home; but said metal is compressed and bulges so as to fill the indentations in the recess. After the nut has been once screwed home, and it is desired to remove the same, it can be effected by applying considerable force thereto, and the metal ring can be readily cut off by driving a suitable cutting implement against the same, which can be guided by the slot in the bolt to avoid any liability of injuring the threads.

I am aware that prior to my invention it has been proposed to provide a nut-lock with a recessed nut and a washer which is adapted to lie within a countersunk cavity, so that the washer will be clamped upon the body portion of the bolt and the nut jammed thereon, and in some cases a pin may be used with such construction to prevent the washer turning; also, that a spring-washer adapted to fit within a conical recess in a nut, as shown in the patent to Nichols, No. 89,066, dated April 20, 1869, and I therefore do not claim, broadly, a recessed nut adapted for use with a washer; but What I do claim as new, and desire to secure by Letters Patent, is—

1. In a nut-lock, the combination of the bolt having a longitudinal slot, a nut having a cavity in its under side with recesses, for the purpose set forth, and a soft-metal or non-elastic ring which is adapted to be upset by the pressure of the nut, so as to fill the cavity therein and enter the slot in the bolt, substantially as set forth.

2. In a nut-lock, the combination of the bolt A, having a longitudinal recess $a$, a soft-metal or non-elastic ring C, and a nut B, having the inner face countersunk and recesses forming an irregular surface adjacent to said countersunk portion of the nut, substantially as set forth.

In testimony whereof I affix my signature in presence of two witnesses.

FRANCIS B. HARVEY.

Witnesses:
THOMAS W. BALDWIN,
C. H. HOWELL.